United States Patent
Lee et al.

(10) Patent No.: US 8,554,462 B2
(45) Date of Patent: Oct. 8, 2013

(54) UNMANNED AERIAL VEHICLE AND METHOD FOR CONTROLLING THE UNMANNED AERIAL VEHICLE

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/349,837

(22) Filed: Jan. 13, 2012

(65) Prior Publication Data

US 2012/0296497 A1 Nov. 22, 2012

(30) Foreign Application Priority Data

May 18, 2011 (TW) .............................. 100117491 A

(51) Int. Cl.
*G06F 17/10* (2006.01)
(52) U.S. Cl.
USPC ................ 701/301; 701/3; 701/523; 382/106
(58) Field of Classification Search
None
See application file for complete search history.

(56) References Cited

U.S. PATENT DOCUMENTS

| 4,700,307 | A | * | 10/1987 | Mons et al. | 701/446 |
|---|---|---|---|---|---|
| 4,743,913 | A | * | 5/1988 | Takai | 342/457 |
| 6,201,883 | B1 | * | 3/2001 | Mizui | 382/109 |
| 2007/0219720 | A1 | * | 9/2007 | Trepagnier et al. | 701/300 |
| 2010/0332136 | A1 | * | 12/2010 | Duggan et al. | 701/301 |
| 2011/0134249 | A1 | * | 6/2011 | Wood et al. | 348/164 |
| 2011/0181689 | A1 | * | 7/2011 | Kweon | 348/37 |
| 2012/0271461 | A1 | * | 10/2012 | Spata | 700/276 |
| 2012/0287275 | A1 | * | 11/2012 | Lutke | 348/148 |

* cited by examiner

*Primary Examiner* — Thomas Black
*Assistant Examiner* — Paul Castro
(74) *Attorney, Agent, or Firm* — Altis & Wispro Law Group, Inc.

(57) ABSTRACT

In a method for controlling an unmanned aerial vehicle (UAV), a digital image is obtained by an image capturing device of the UAV. The method detects an object in the digital image, determines a distance between the detected object and the UAV, and obtains a flight direction of the UAV if the distance is less than a preset value. The method further calculates a relative position and a relative angle between the detected object and the UAV, determines a flight limiting range of the UAV according to the relative position and the relative angle, and controls the flight direction of the UAV according to the flight limiting range.

16 Claims, 5 Drawing Sheets

UNMANNED AERIAL VEHICLE AND METHOD FOR CONTROLLING THE UNMANNED AERIAL VEHICLE

BACKGROUND

1. Technical Field

Embodiments of the present disclosure relate to helicopter control technology, and particularly to an unmanned aerial vehicle (UAV) and a method for controlling the UAV.

2. Description of Related Art

UAVs have been used to perform security surveillance by capturing images of a number of monitored scenes, and sending the captured images to a monitor computer. To avoid an obstacle a flight direction of the UAV needs to be changed using a special controller. If an administrator wants to change the flight direction of the UAV to the left, the administrator has to move a control lever of the special controller towards the left. However, because of human error during the operation of the special controller, a wrong control operation of the UAV may be implemented. Therefore, an efficient method for controlling the UAV is desired, to control the UAV to fly in a proper direction.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
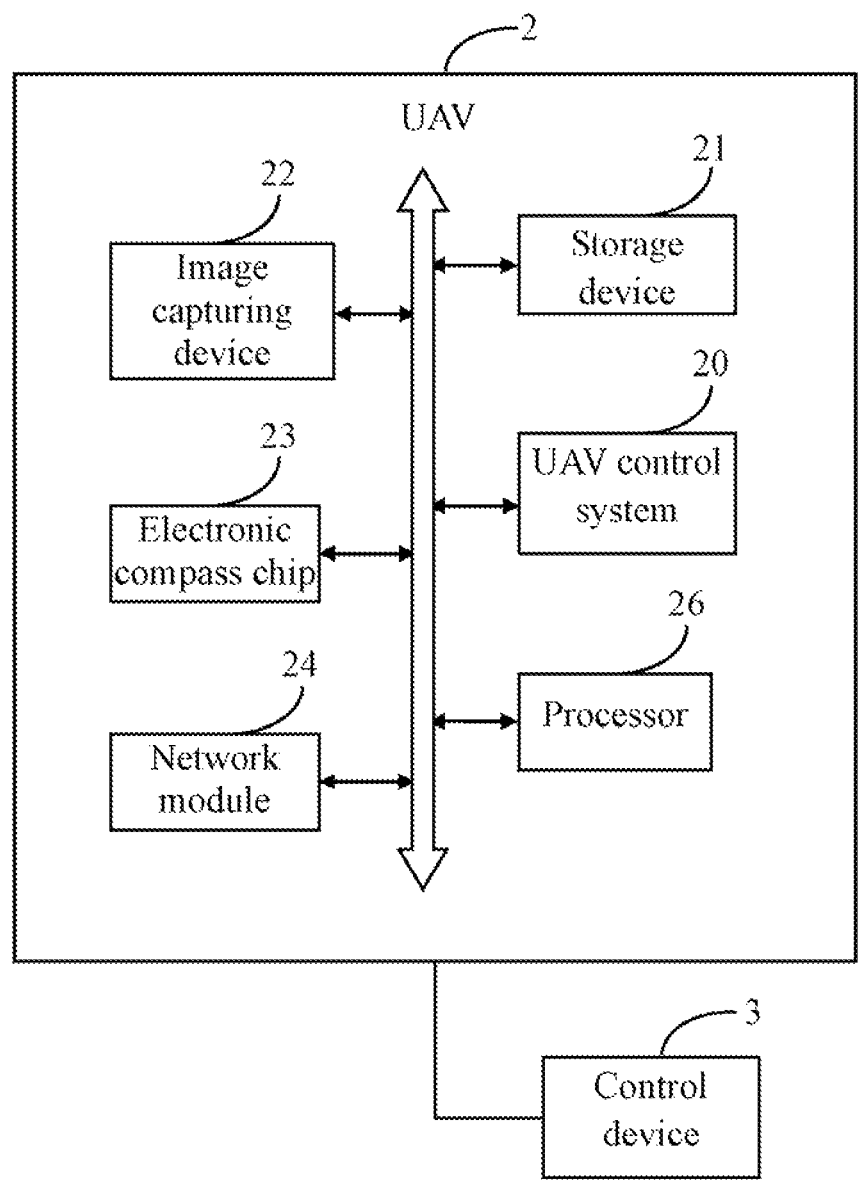
FIG. 1 is a block diagram of one embodiment of an unmanned aerial vehicle (UAV) including an UAV control system.

FIG. 1 is a block diagram of one embodiment of an unmanned aerial vehicle (UAV) 2 including a UAV control system 20. In the embodiment, the UAV 2 further includes a storage device 21, an image capturing device 22, an electronic compass chip 23, a network module 24, and at least one processor 26. FIG. 1 illustrates only one example of the UAV 2 that may include more or fewer components than illustrated, or a different configuration of the various components in other embodiments.

In one embodiment, the UAV 2 is controlled using a control device 3. The control device 3 has a control lever to control the flight direction of the UAV 2. For example, the control lever of the control device 3 may be moved left to control the UAV 2 to move westwards.

In one embodiment, the image capturing device 22 may be a speed dome camera or pan/tilt/zoom (PTZ) camera, for example. It is understood that, in this embodiment, the image capturing device 22 is a camera system that captures a distance from a target object to a lens of the image capturing device 22 (distant information) using the time-of-flight (TOF) principle, which can obtain a distance between the lens of the image capturing device 22 and each point on the target object to be captured, so that each of the digital images captured by the image capturing device 22 includes distance information between the lens and the object in the digital image.

The electronic compass chip 23 detects the movement and orientation of the UAV 2 when it is moving. The network module 24 connects the UAV 2 with the control device through a wireless network, such as a GPRS, WIFI/WLAN, and 3G/WCDMA system.

The UAV control system 20 detects an object in a digital image captured by the image capturing device 22, and controls a flight direction of the UAV 2 to avoid a collision between the UAV 2 and the object. In one embodiment, the UAV control system 20 may include computerized instructions in the form of one or more programs that are executed by the at least one processor 26 and stored in the storage device 21 (or memory). A detailed description of the UAV control system 20 will be given in the following paragraphs.

Figure 2:
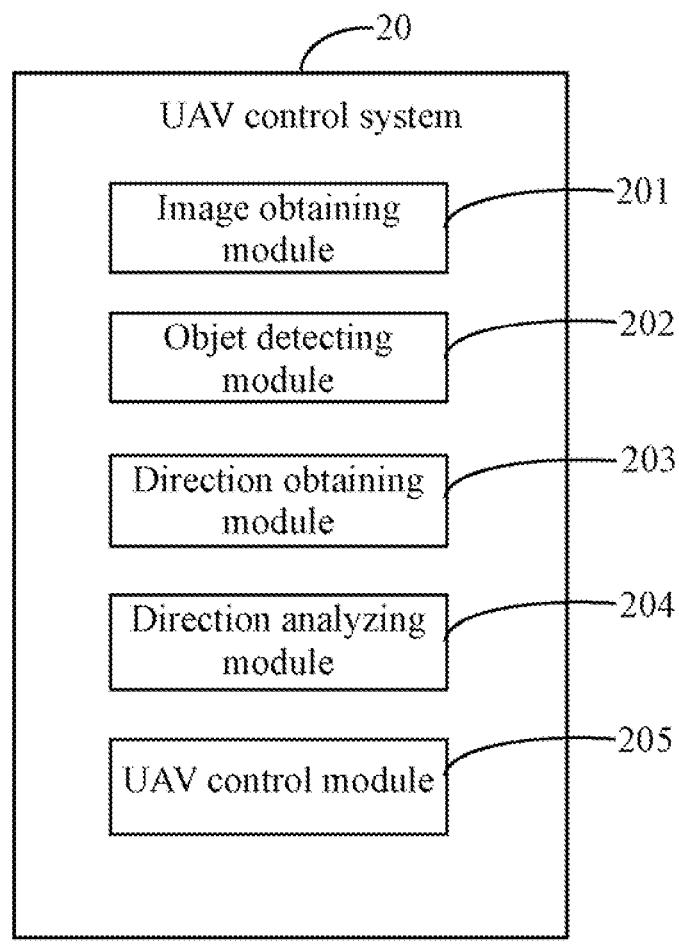
FIG. 2 is a block diagram of one embodiment of the UAV control system included in the UAV.

FIG. 2 is a block diagram of one embodiment of the UAV control system 20 included in the UAV 2. In one embodiment, the UAV control system 20 may include one or more modules, for example, an image obtaining module 201, an object detecting module 202, a direction obtaining module 203, a direction analyzing module 204, and an UAV control module 205. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
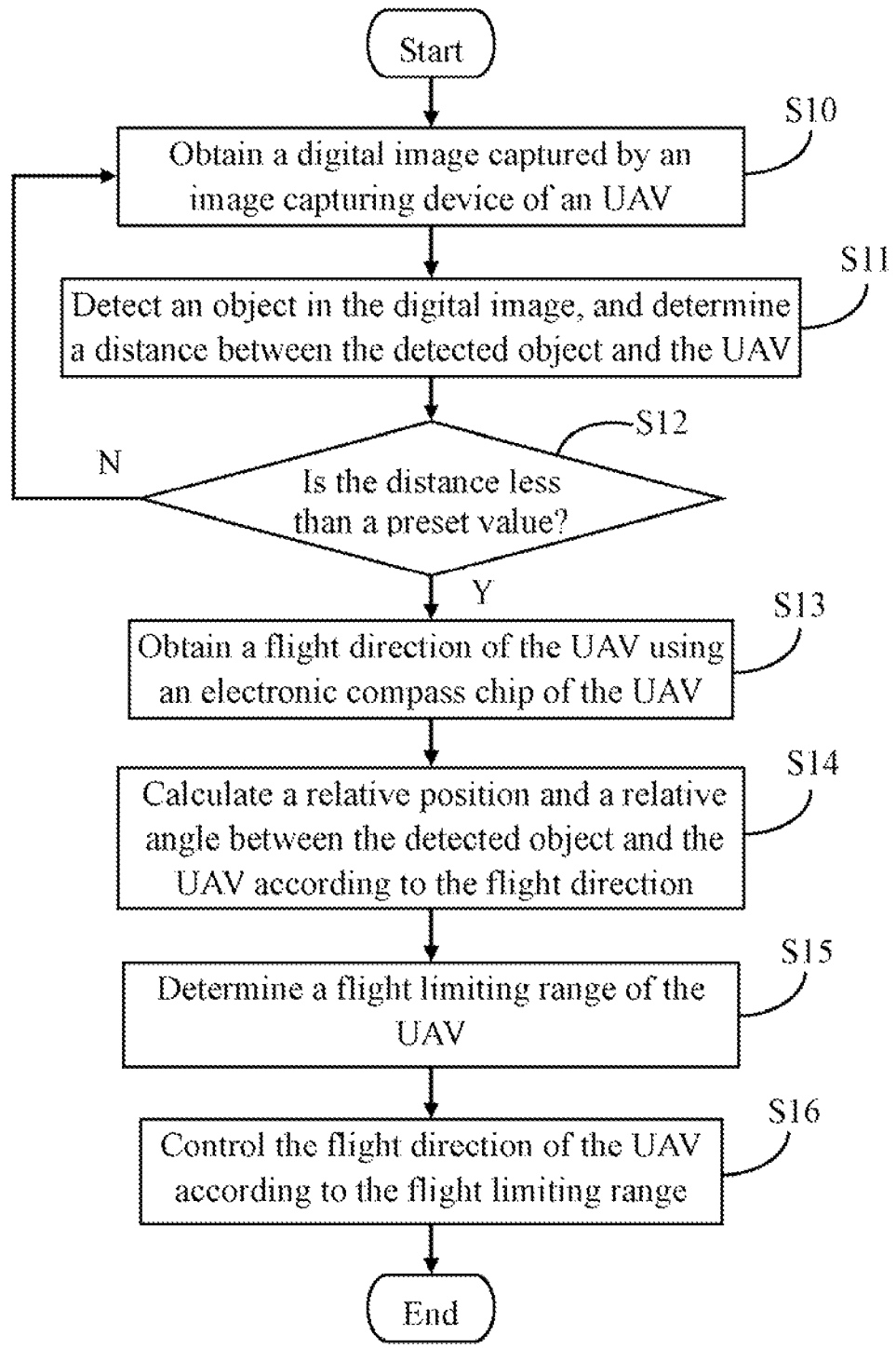
FIG. 3 is a flowchart of one embodiment of a method for controlling the UAV.

FIG. 3 is a flowchart of one embodiment of a method for controlling the UAV 2. Depending on the embodiment, additional blocks may be added, others removed, and the ordering of the blocks may be changed.

In block S10, the image obtaining module 201 obtains a digital image captured by the image capturing device 22. In this embodiment, only one image capturing device 22 is installed on a head of the UAV 2. In other embodiments, more than one image capturing devices may be installed on the UAV 2. For example, two image capturing devices are installed on fore-and-aft direction of the UAV 2.

In block S11, the object detecting module 202 detects an object in the digital image using an object detection method, and determines a distance between the detected object and the UAV 2. In one embodiment, the object detection method may be a robust real-time object detection method. The distance between the detected object and the UAV 2 is determined as a distance between the detected object and the lens of the image capturing device 22. In one embodiment, the detected object is regarded as an obstacle of the UAV 2.

In block S12, the object detecting module 202 determines if the distance is less than a preset value (e.g., ten meters). If the distance is less than the preset value, the procedure goes to block S13. If the distance is greater than or equal to the preset value, the procedure returns to block S10. In other embodiments, if more than one image capturing devices 22 are installed on the UAV 2, the object detecting module 202 detects one or more objects in all digital images captured by each of the image capturing devices 22, determines a distance between each of the detected objects and the UAV 2. A shortest distance is compared with the preset value by the object detecting module 202.

In block S13, the direction obtaining module 203 obtains a flight direction of the UAV 2 using the electronic compass chip 23. In one embodiment, the flight direction of the UAV 2 includes a cardinal direction, a deflecting direction, and a deflecting angle of the UAV 2. For example, the flight direction of the UAV 2 is north-east twenty degrees (N-E 20°), where the first letter "N" (north) represents the cardinal direction of the UAV 2, the second letter "E" (east) represents the deflecting direction corresponding to the cardinal direction of the UAV 2, and the third digit "20°" represents degrees of the deflecting angle of the UAV 2.

In block S14, the direction analyzing module 204 calculates a relative position and a relative angle between the detected object and the UAV 2 according to the flight direction of the UAV 2. A detailed description is as follows.

Figure 4:
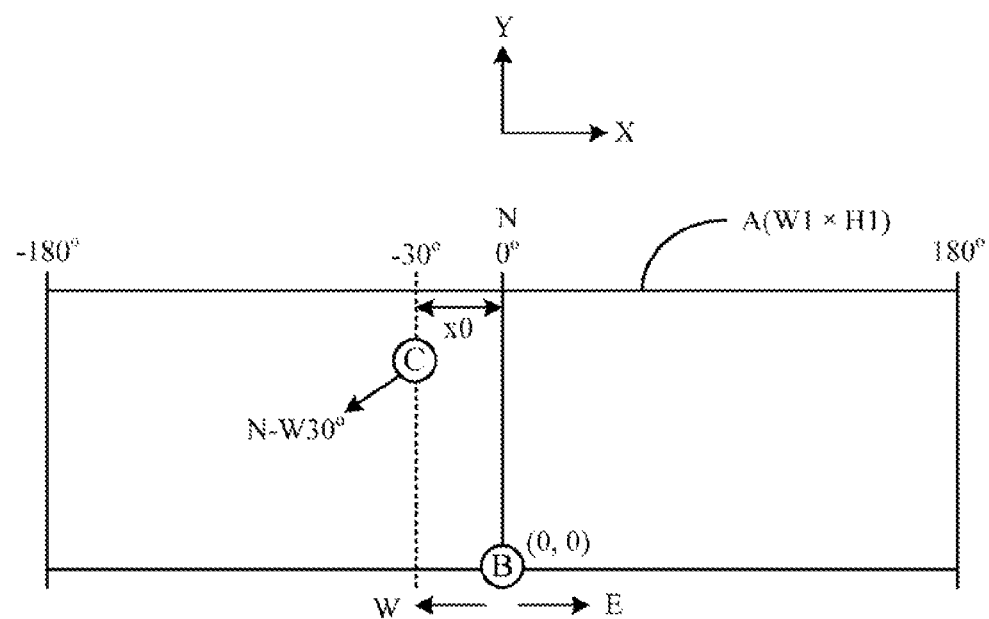
FIG. 4 is an exemplary schematic diagram of one embodiment of a relative position and a relative angle between a detected object and the UAV.

First, the direction analyzing module 204 creates a coordinate system for the digital image based on the flight direction of the UAV 2, and determines the relative position between the detected object and the UAV 2 according to the coordinate system. For example, as shown in FIG. 4, suppose that "A" represents the digital image with a width "W1" and a height "H1," "B" represents the UAV 2, "C" represents the detected object in the digital image "A," the flight direction of the UAV 2 is N–0°. A position of the UAV 2 is determined as an origin (0, 0) of the coordinate system. If a positive direction of an X-axis of the coordinate system represents east (E), a negative direction of the X-axis represents west (W), a positive direction of a Y-axis of the coordinate system represents north (N), a negative direction of the Y-axis represents south (S), the relative position between the detected object "C" and the UAV 2 is determined as north-west (N-W).

Second, the direction analyzing module 204 obtains coordinates (x0, y0) of the detected object "C" based on the coordinate system, and calculates the relative angle between the detected object "C" and the UAV 2 using a formula of "(x0×360°)/W1," where "x0" represents an X-axis coordinate of the detected object "C". In this embodiment, the width of the digital image represents 360 degrees (e.g., from –180° to 180°. As shown in FIG. 4, the relative angle between the detected object "C" and the UAV 2 is 30°, the relative position and the relative angle between the detected object "C" and the UAV 2 is determined as north-west thirty degrees (N-W 30°).

Figure 5:
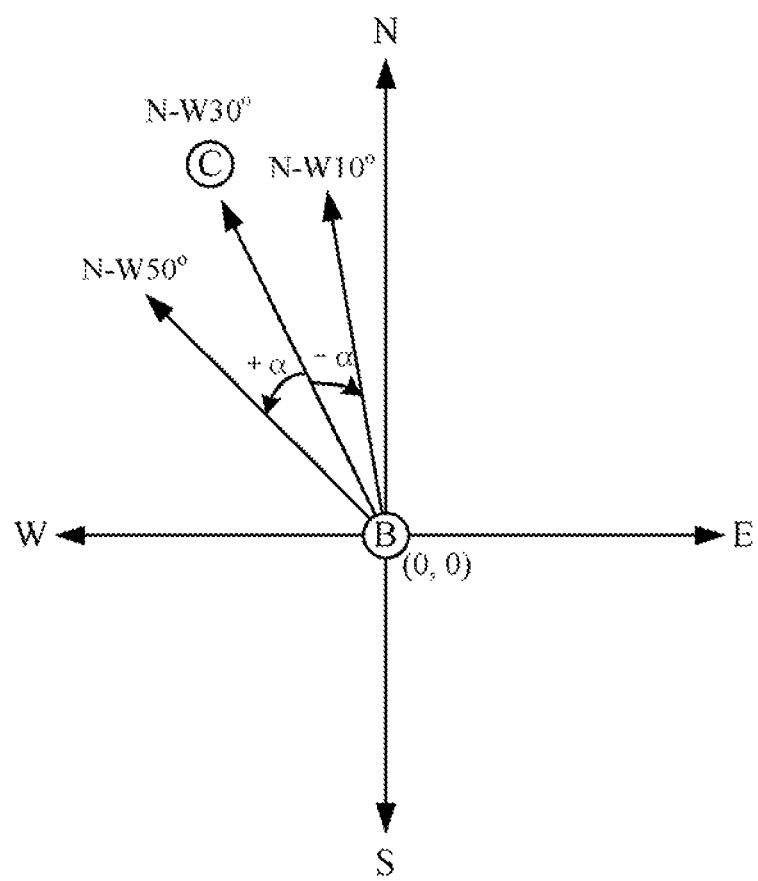
FIG. 5 is an exemplary schematic diagram of one embodiment of a flight limiting range of the UAV.

In block S15, the direction analyzing module 204 determines a flight limiting range of the UAV 2 according to the relative position and the relative angle. In one embodiment, the flight limiting range of the UAV 2 is determined by expanding the relative angle with a preset angle (e.g., twenty degrees) based on the relative position and the relative angle. For example, as shown in FIG. 5, suppose that the direction of the UAV 2 is "N-W 30°", where "α" represents the preset angle (e.g., α=20°), thus the flight limiting range of the UAV 2 is [N-W 10°, E-N 50°].

In block S16, the UAV control module 205 sends the flight limiting range of the UAV 2 to the control device 3 of the UAV 2, and controls the flight direction of the UAV 2 according to the flight limiting range.

In other embodiments, if a signal receiver of the UAV 2 receives a control command from a signal generator of the control device 3, the UAV control module 205 prevents the UAV 2 from executing the control command if a flight direction corresponding to the control command is within the flight limiting range, to prevent the UAV 2 from executing a dangerous control command, and avoiding a collision between the UAV 2 and the detected object (i.e., the obstacle). Furthermore, the UAV control module 205 may send a warning signal to the control device 3 through the network module 24. The control device 3 may output an alert message through a warning lamp and/or voice to prompt an administrator who operates the control device 3.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for controlling an unmanned aerial vehicle, the method comprising:
   obtaining a digital image captured by an image capturing device of the UAV;
   detecting an object in the digital image, and determining a distance between the detected object and the UAV;
   obtaining a flight direction of the UAV using an electronic compass chip of the UAV upon the condition that the distance is less than a preset value;
   calculating a relative position and a relative angle between the detected object and the UAV in a coordinate system of the digital image, a position of the UAV being determined as an origin of the coordinate system;
   wherein the relative position and the relative angle are calculated by creating the coordinate system for the digital image based on the flight direction of the UAV, and determining the relative position between the detected object and the UAV according to the coordinate system; and
   obtaining coordinates (x0, y0) of the detected object based on the coordinate system, and calculating the relative angle between the detected object and the UAV using a formula of "(x0×360°/W1," wherein "x0" represents an X-axis coordinate of the detected object and "W1" represents a width of the digital image;
   determining a flight limiting range of the UAV according to the relative position and the relative angle; and
   controlling the flight direction of the UAV according to the flight limiting range.

2. The method according to claim 1, further comprising:
   receiving a control command from a control device of the UAV; and
   preventing the UAV from executing the control command upon the condition that a flight direction corresponding to the control command is within the flight limiting range.

3. The method according to claim 1, wherein the distance between the detected object and the UAV is determined as a distance between the detected object and a lens of the image capturing device.

4. The method according to claim 1, wherein the flight direction of the UAV comprises a cardinal direction, a deflecting direction, and a deflecting angle of the UAV.

5. The method according to claim 1, wherein the flight limiting range of the UAV is determined by expanding the relative angle with a preset angle based on the relative position and the relative angle.

6. An unmanned aerial vehicle (UAV) in communication with a control device, the UAV comprising:
- an image capturing device and an electronic compass chip;
- a storage device and at least one processor; and
- one or more modules that are stored in the storage device and executed by the at least one processor, the one or more modules comprising:
- an image obtaining module that obtains a digital image captured by the image capturing device;
- an object detecting module that detects an object in the digital image, and determining a distance between the detected object and the UAV;
- a direction obtaining module that obtains a flight direction of the UAV using the electronic compass chip upon the condition that the distance is less than a preset value;
- a direction analyzing module that calculates a relative position and a relative angle between the detected object and the UAV in a coordinate system of the digital image, a position of the UAV being determined as an origin of the coordinate system;
- wherein the relative position and the relative angle are calculated by the steps of:
- creating the coordinate system for the digital image based on the flight direction of the UAV, and determining the relative position between the detected object and the UAV according to the coordinate system;
- obtaining coordinates $(x0, y0)$ of the detected object based on the coordinate system; and
- calculating the relative angle between the detected object and the UAV using a formula of "$(x0 \times 360°/W1$," wherein "$x0$" represents an X-axis coordinate of the detected object and "$W1$" represents a width of the digital image;
- the direction analyzing module that determines a flight limiting range of the UAV according to the relative position and the relative angle; and
- an UAV control module that controls the flight direction of the UAV according to the flight limiting range.

7. The UAV according to claim 6, wherein the UAV control module further receives a control command from a control device of the UAV, and prevents the UAV from executing the control command upon the condition that a flight direction corresponding to the control command is within the flight limiting range of the UAV.

8. The UAV according to claim 6, wherein the distance between the detected object and the UAV is determined as a distance between the detected object and a lens of the image capturing device.

9. The UAV according to claim 6, wherein the flight direction of the UAV comprises a cardinal direction, a deflecting direction, and a deflecting angle of the UAV.

10. The UAV according to claim 6, wherein the flight limiting range of the UAV is determined by expanding the relative angle with a preset angle based on the relative position and the relative angle.

11. A non-transitory storage medium having stored thereon instructions that, when executed by a processor of an unmanned aerial vehicle (UAV), causes the processor to perform a method for controlling the UAV, the method comprising:
- obtaining a digital image captured by an image capturing device of the UAV;
- detecting an object in the digital image, and determining a distance between the detected object and the UAV;
- obtaining a flight direction of the UAV using an electronic compass chip of the UAV upon the condition that the distance is less than a preset value;
- calculating a relative position and a relative angle between the detected object and the UAV in a coordinate system of the digital image, a position of the UAV being determined as an origin of the coordinate system;
- wherein the relative position and the relative angle are calculated by creating the coordinate system for the digital image based on the flight direction of the UAV, and determining the relative position between the detected object and the UAV according to the coordinate system; and
- obtaining coordinates $(x0, y0)$ of the detected object based on the coordinate system, and calculating the relative angle between the detected object and the UAV using a formula of "$(x0 \times 360°/W1$," wherein "$x0$" represents an X-axis coordinate of the detected object and "$W1$" represents a width of the digital image;
- determining a flight limiting range of the UAV according to the relative position and the relative angle; and
- controlling the flight direction of the UAV according to the flight limiting range.

12. The non-transitory storage medium according to claim 11, wherein the method further comprises:
- receiving a control command from a control device of the UAV; and
- preventing the UAV from executing the control command upon the condition that a flight direction corresponding to the control command is within the flight limiting range of the UAV.

13. The non-transitory storage medium according to claim 11, wherein the distance between the detected object and the UAV is determined as a distance between the detected object and a lens of the image capturing device.

14. The non-transitory storage medium according to claim 11, wherein the flight direction of the UAV comprises a cardinal direction, a deflecting direction, and a deflecting angle of the UAV.

15. The non-transitory storage medium according to claim 11, wherein the flight limiting range of the UAV is determined by expanding the relative angle with a preset angle based on the relative position and the relative angle.

16. The non-transitory storage medium according to claim 13, wherein the medium is selected from the group consisting of a hard disk drive, a compact disc, a digital video disc, and a tap drive.

* * * * *